US011620570B2

(12) United States Patent
Malhotra et al.

(10) Patent No.: US 11,620,570 B2
(45) Date of Patent: Apr. 4, 2023

(54) SELF-LEARNING ONTOLOGY-BASED COGNITIVE ASSIGNMENT ENGINE

(71) Applicant: KYNDRYL, INC., New York, NY (US)

(72) Inventors: Nikhil Malhotra, Bangalore (IN); Atri Mandal, Bangalore (IN); Giriprasad Sridhara, Bangalore (IN); Vijay Ekambaram, Chennai (IN)

(73) Assignee: KYNDKYL, INC., New York, NY (US)

( * ) Notice: Subject to any disclaimer, the term of this patent is extended or adjusted under 35 U.S.C. 154(b) by 377 days.

(21) Appl. No.: 16/449,906

(22) Filed: Jun. 24, 2019

(65) Prior Publication Data

US 2020/0401935 A1    Dec. 24, 2020

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC .......... G06N 20/00; G06N 5/04; G06N 5/022; G05F 16/367; G06F 16/367
See application file for complete search history.

(56) References Cited

U.S. PATENT DOCUMENTS

| | | |
|---|---|---|
| 6,970,908 B1 | 11/2005 | Larky |
| 8,286,085 B1 | 10/2012 | Denise |
| 8,473,432 B2 * | 6/2013 | Anerousis ............... G06N 5/043 706/45 |
| 9,286,549 B1 * | 3/2016 | Ioffe .................... G06K 9/6276 |
| 10,019,716 B1 | 7/2018 | Ainslie |

(Continued)

FOREIGN PATENT DOCUMENTS

WO    WO-2019174414 A1 *   9/2019   ........... G06K 9/6215

OTHER PUBLICATIONS

Ripal Patel et al., / (IJCSIT) International Journal of Computer Science and Information Technologies, vol. 5 (1) , 2014,84-87 (Year: 2014).*

(Continued)

*Primary Examiner* — Viker A Lamardo
(74) *Attorney, Agent, or Firm* — Tutunjian & Bitetto, P.C.; Dan Housley

(57) ABSTRACT

A cognitive assignment engine (CAE) system attempts to infer semantic meaning from textual content of an incoming message in order to use the inferred meaning to assign the message to an appropriate responder. If the message contains insufficient textual content, the system identifies ontological structures comprised by the message's graphical content and classifies each structure as a function of the structure's location within the graphical content or of an intrinsic characteristic of the structure. The system then generates a message identifier by performing a computation on these classifications and uses the identifier to retrieve a previously stored graphical template that comprises ontological structures similar to those of the incoming message. The system associates the incoming message with a semantic meaning previously associated with the template, enabling the system to classify the message and to assign the message to the correct responder.

20 Claims, 9 Drawing Sheets

(56) References Cited

U.S. PATENT DOCUMENTS

| | | | |
|---|---|---|---|
| 10,769,503 B1* | 9/2020 | Buhler | G06K 9/6215 |
| 2007/0233459 A1 | 10/2007 | Perronnin | |
| 2012/0269436 A1* | 10/2012 | Mensink | G06V 30/244 |
| | | | 382/180 |
| 2015/0081824 A1 | 3/2015 | Caldwell | |
| 2016/0179945 A1* | 6/2016 | Lastra Diaz | G06F 16/284 |
| | | | 707/739 |
| 2017/0221373 A1* | 8/2017 | Dasgupta | G09B 7/02 |
| 2017/0270674 A1* | 9/2017 | Shrivastava | G06K 9/6256 |
| 2017/0302540 A1* | 10/2017 | Monahan | H04L 41/5051 |
| 2018/0336485 A1* | 11/2018 | Bikumala | G06F 16/285 |
| 2019/0019110 A1* | 1/2019 | Sharifi | H04W 4/02 |
| 2019/0034057 A1 | 1/2019 | Rudchenko | |
| 2019/0220758 A1* | 7/2019 | Talyansky | G06N 20/00 |
| 2020/0042837 A1* | 2/2020 | Skinner | G06K 9/623 |

OTHER PUBLICATIONS

Altintas et al, Machine Learning Based Ticket Classification in Issue Tracking Systems, Proceeding of the International Conference on Artificial Intelligence and Computer Science (AICS 2014), Sep. 15-16, 2014, Bandung, Indonesia. (e-ISBN978-967-11768-8-7). (Year: 2014).*

Salvi et al., Bloom Filters and Compact Hash Codes for Efficient and Distributed Image Retrieval, 2016 IEEE International Symposium on Multimedia (Year: 2016).*

Patel, R. et al. "Face Recognition using Eye Distance and PCA Approaches." (2014). (Year: 2014).*

Salvi, Andrea & Ercoli, Simone & Bertini, Marco & Del Bimbo, Alberto. (2016). Bloom Filters and Compact Hash Codes for Efficient and Distributed Image Retrieval. 515-520. 10.1109/ISM. 2016.0113. (Year: 2016).*

Altintas, Mucahit et al.; Machine Learning Based Ticket Classification in Issue Tracking Systems; Proceedings of the International Conference on Artificial Intelligence and Computer Science; Sep. 15-16, 2014; pp. 195-207.

Xu, Jian et al.; Trouble Ticket Routing Models and Their Applications; IEEE Transactions on Network and Service Management, vol. 15, No. 2; Jun. 2018; pp. 530-543.

Labriola, Donald J.; List of IBM Patents or Patent Applications Treated as Related; Jul. 6, 2021; 1 page.

Mell, Peter et al.; "The NIST Definition of Cloud Computing;" National Institute of Standards and Technology; Special Publication 800-145; Sep. 2011; 7 pages.

U.S. Appl. No. 15/970,449, filed May 3, 2018.

Wikipedia; Ontology; https://en.wikipedia.org/wiki/Ontology; retrieved from the Internet Feb. 10, 2022; 33 pages.

* cited by examiner

700 — DBMSWare

710 — Tax Invoice/Bill of Supply/Cash Memo
(Original for Recipient)

Sold By:

RetailerXYZ
Urban Center Complex
420 Main Street, Ste. 3000
New York, NY 00000-2032

720

Billing Address:

John Smith
PO Box 2421-3801
Fort Lauderdale, FL 93801

PNM No: AALCA0171E
UPC Registration No: 29AALCA0171E1ZV

730 —

Shipping Address:

John Smith
3778 Appian Way
Fort Lauderdale, FL 93801

Order Number: 406-6334631-8908340
Order Date: 30.12.2017

Invoice Number: BLR5-84519
Invoice Details: KA-BLR5-1034-1718
Invoice Date: 30.12.2017

740 —

| # | Description | Unit Price | Qty | Net $Amt | Tax Rate | Tax Class | Tax $Amt | Total $Amt |
|---|---|---|---|---|---|---|---|---|
| 1 | 12TB USB 3.0 External HDD | $99.45 | 01 | $99.45 | .08 | NYS | $7.96 | $107.41 |
| 2 | 6m USC-C M-M cable | $7.95 | 01 | $7.95 | .08 | NYS | $0.64 | $8.59 |
| 3 | 36m EXT WAR | $25.00 | 01 | $25.00 | 0.0 | N/A | $0.00 | $25.00 |

TOTAL: $8.59 $115.99

Amount in Words:
One Hundred and Fifteen Dollars and Ninety-Nine Cents

FOR RetailerXYZ

750 —

Authorized Signatory

DBMSWare

800 —

810 — *Invoice / Bill of Sale / Cash Memo*
Original Copy

Billing: — 830
John Smith
PO Box 2421-3801
Fort Lauderdale, FL 93801

Shipping:
John Smith
3778 Appian Way
Fort Lauderdale, FL 93801

Sold By: — 820
SellerXYZ
Southeast Reciprocal Cooperative
3000-0402 Ulua Street, Ste. 447
Greenburg, NC 00001-4447

Invoice Number: BOM1-32365
Invoice Details: MH-BOM1-144649041-1718
Invoice Date: 04.01.2018

PNMNo: ACYPL9620R
UPC Registration No: 27ACYPL9620R1ZD
Order Number: 406-7112538-8487546
Order Date: 04.01.2018

840 —

| # | Description | Unit Price | Qty | Net $Amt | Tax Rate | Tax Class | Tax $Amt | Total $Amt |
|---|---|---|---|---|---|---|---|---|
| 1 | DBMS 2.015AC Upgrade | $315.00 | 01 | $315.00 | 0.0 | N/A | $0.00 | $315.00 |
| 2 | Limited Warranty | 0 | 01 | $0.00 | 0.0 | N/A | $0.00 | $0.00 |
|   |   | N/A |   | $0.00 | 0.0 | N/A | $0.00 | $0.00 |

Total Due    $0.00    $315.00

Authorized By     Electronic Signature — 850

SELF-LEARNING ONTOLOGY-BASED COGNITIVE ASSIGNMENT ENGINE

BACKGROUND

The present invention relates in general to computerized communications systems and in particular to cognitive recognition of visual elements of a graphical communication.

A user may send an electronic communication, such as an email message or text message, that contains an attached or embedded image. For example, an incident report submitted to a customer-support operation may include a screenshot that illustrates the software problem being reported.

A cognitive assignment engine (CAE) can expedite the help desk's efforts to resolve such incidents by inferring semantic meaning from a user's message. These inferences allow the CAE to identify or diagnose the reported problem and assign the incident to an appropriate problem-resolution team or team member. CAE applications generally derive such inferences by analyzing text in the message's body text or subject line.

SUMMARY

Embodiments of the present invention comprise systems, methods, and computer program products for a self-learning cognitive assignment engine (CAE) system. When receiving an incoming message from a user, the CAE system first attempts to infer semantic meaning from the message's textual content, and then use the inferred meaning to assign the message to an appropriate responder. If the message contains insufficient textual content to enable such an inference, the system next attempts to identify graphical, ontological structures comprised by the message's graphical content and classifies each structure as a function of the structure's location within the graphical content or of an intrinsic characteristic of the structure. The system then generates a message identifier by performing a computation on numeric values associated with these classifications and uses the message identifier to retrieve a previously stored graphical template that comprises ontological structures similar to those extracted from the incoming message. The system associates the incoming message with a semantic meaning previously associated with the template, enabling the system to classify the message and to assign the message to s responder responsible for responding to messages associated with the semantic meaning.

BRIEF DESCRIPTION OF THE DRAWINGS

FIG. 7 shows ontological structures inferred from a second graphical object by embodiments of the present invention.

FIG. 8 shows ontological structures inferred, by embodiments of the present invention, from a third graphical object that is related to the second graphical object of FIG. 7.

FIG. 9 shows an ontological template generated by an embodiment of the present invention by inferring relationships between ontological structures of the first graphical object of FIG. 7 and ontological structures of the second graphical object of FIG. 8.

DETAILED DESCRIPTION

Figure 1:
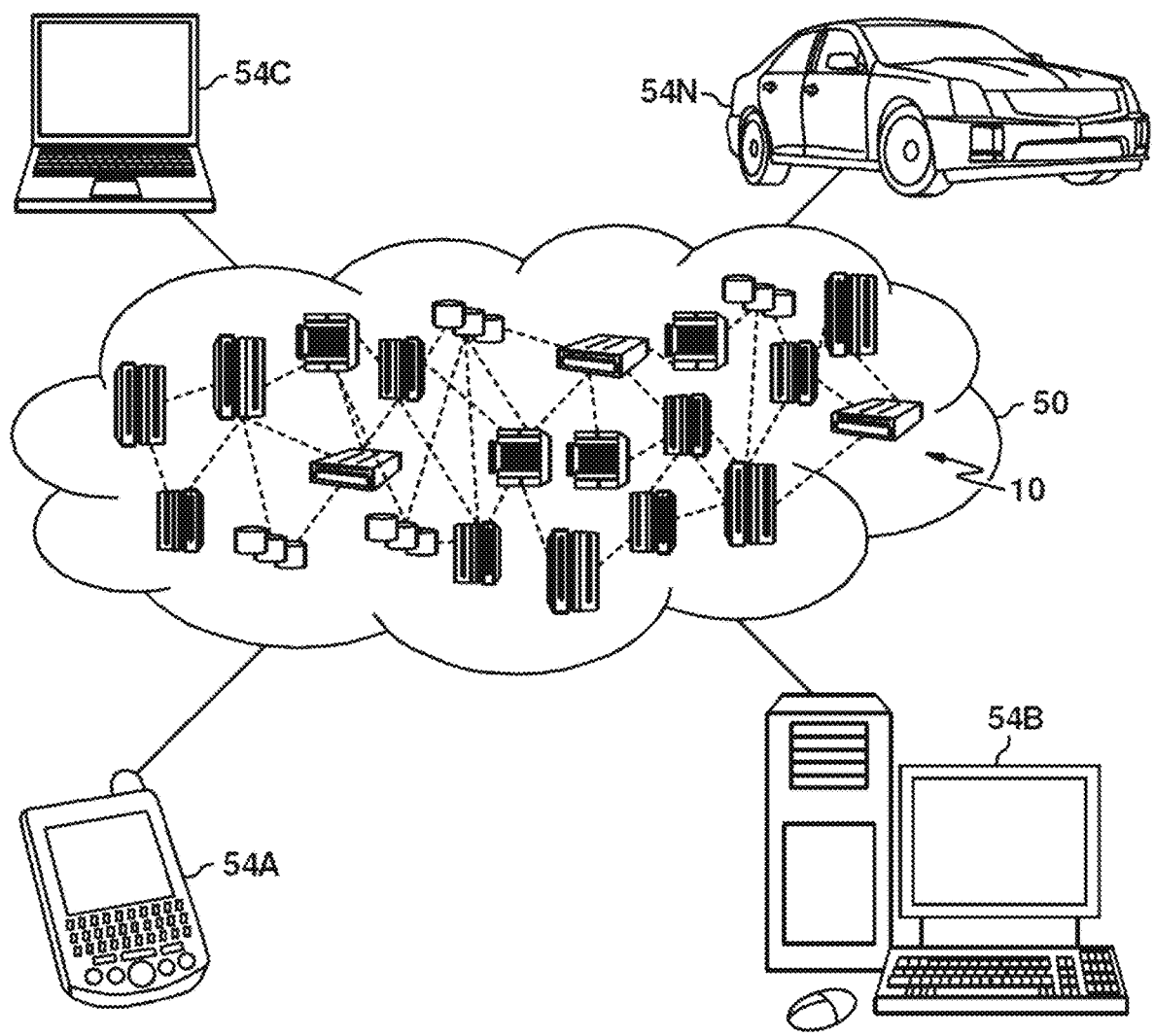
FIG. 1 depicts a cloud computing environment according to an embodiment of the present invention.

A cognitive assignment engine (CAE) can perform tasks like cognitively analyzing an incoming incident report and then, using inferences derived from its analysis, diagnosing and responding to the report or forwarding the incident to an appropriate resolution team or team member.

Known CAEs derive such inferences through methods of artificial intelligence, such as natural-language processing (NLP), that perform syntactical or semantic analysis upon textual elements of the incident report. Such systems require at least a natural-language textual description of an incident, such as a problem description listed in an email message's body text or subject line. The same requirements exist when analyzing other types of incoming messages received as text messages, reports submitted through a dedicated support application, or other known formats.

If such a message does not contain textual content sufficient to provide context, a CAE is unable to analyze or otherwise process the message. This problem occurs when, for example, a user submits a problem report by sending an email message with a generic subject line or body text, such as "Please resolve this issue," or "problem with crash." Existing CAE applications cannot determine how to handle such messages, even when a message is accompanied by a screenshot that would be capable of allowing a human team to characterize a reported problem.

Similar considerations exist when other types of automated messaging or support facilities must triage or otherwise distribute incoming messages. For example, a product inquiry may arrive as an email message that consists of a screenshot of a product-info page, a subject line stating "requesting sales call re: this product line," and no body text. In this example, a CAE would not have sufficient textual input to determine which product team should receive the request.

Embodiments of the present invention provide improved CAE systems, methods, and computer program products capable of intelligently processing such messages, even if a message contains no text at all. Such improved technologies may use a mechanism like a distributed hash table to index and cluster ontological templates. These templates are derived from common, semantically meaningful structural patterns inferred from graphical content like screenshot attachments. Embodiments then use these templates to identify an issue, problem, question, or other contextual characteristic of an incoming message and to respond by communicating directly to the sender or by forwarding the incoming message to a selected resolution team or team member.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
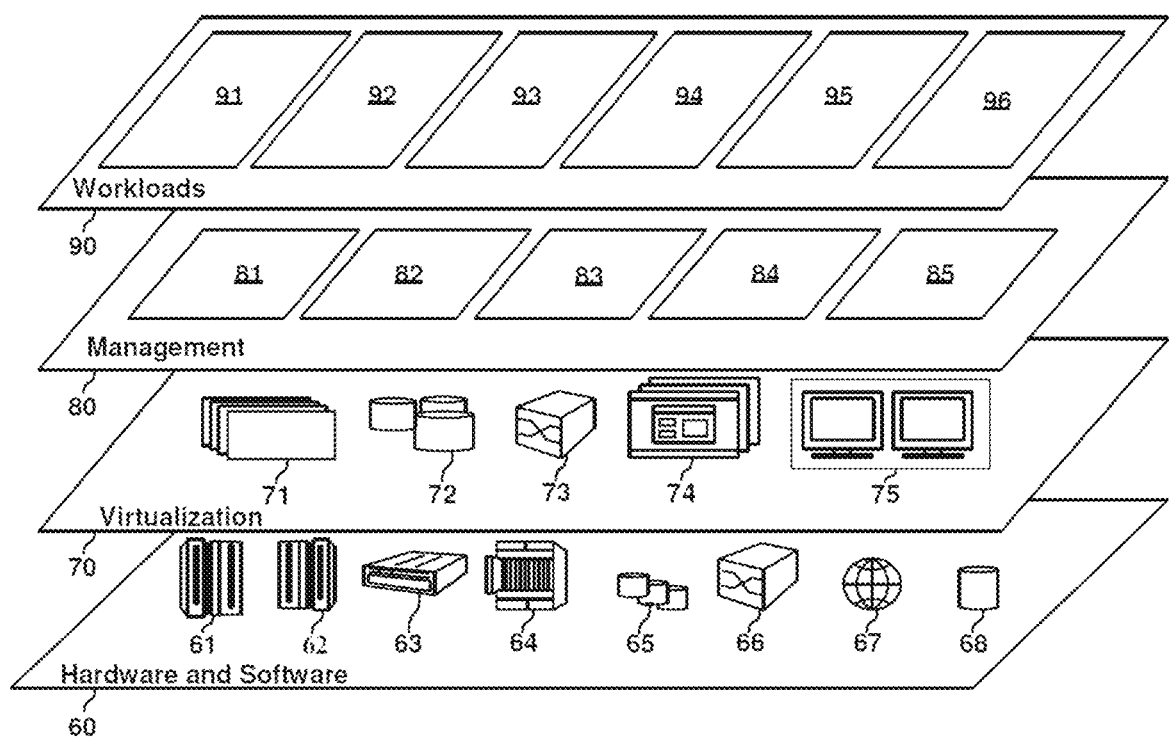
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of a self-learning ontology-based cognitive assignment engine.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
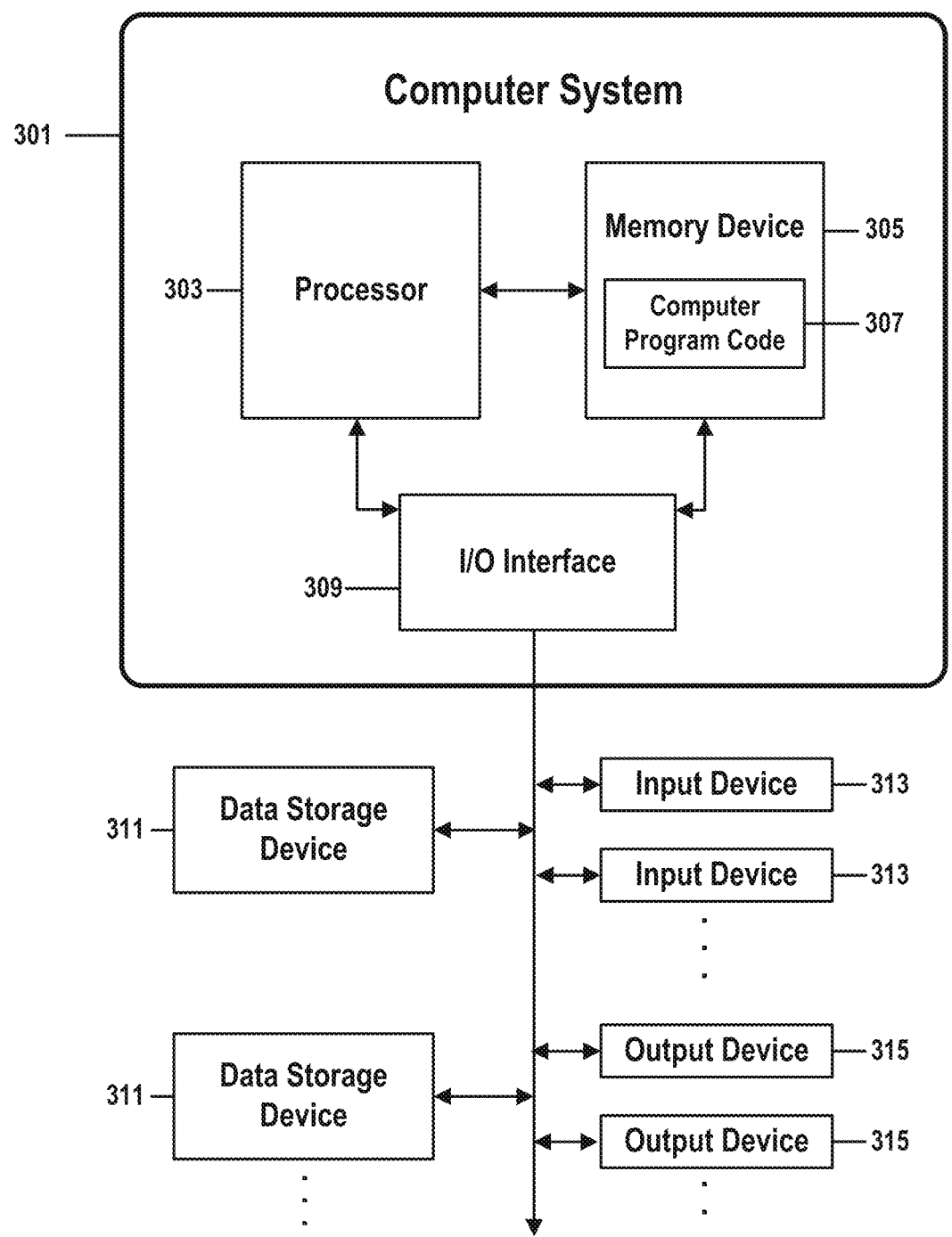
FIG. 3 shows the structure of a computer system and computer program code that may be used to implement a method for a self-learning ontology-based cognitive assignment engine_in accordance with embodiments of the present invention.

FIG. 3 shows a structure of a computer system and computer program code that may be used to implement a method for a self-learning ontology-based cognitive assignment engine in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a self-learning ontology-based cognitive assignment engine in accordance with embodiments of the present invention, and may implement other embodiments described in this specification, including the methods illustrated in FIGS. 1-9. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for a self-learning ontology-based cognitive assignment engine.

Any of the components of the present invention could be created, integrated, hosted, maintained, deployed, managed, serviced, supported, etc. by a service provider who offers to facilitate a method for a self-learning ontology-based cognitive assignment engine. Thus the present invention discloses a process for deploying or integrating computing infrastructure, comprising integrating computer-readable code into the computer system 301, wherein the code in combination with the computer system 301 is capable of performing a method for a self-learning ontology-based cognitive assignment engine.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for a self-learning ontology-based cognitive assignment engine_may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a self-learning ontology-based cognitive assignment engine_is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by the program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
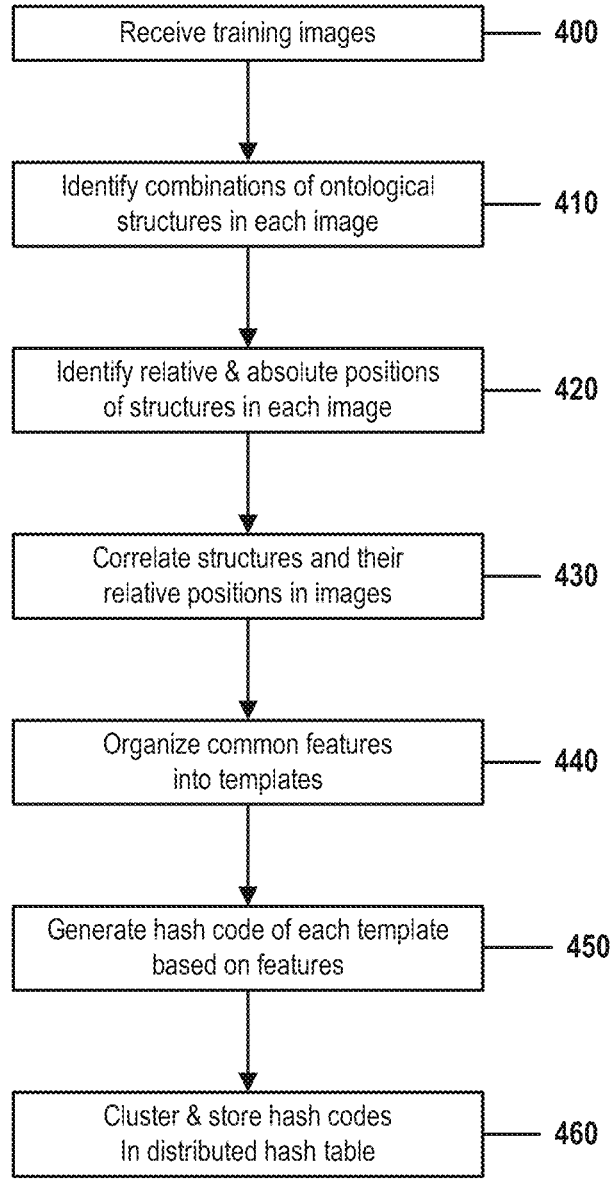
FIG. 4 is a flow chart that illustrates steps of a method for developing ontological templates for a self-learning ontology-based cognitive assignment engine in accordance with embodiments of the present invention.

FIG. 4 is a flow chart that illustrates steps of a method for developing ontological templates for a self-learning ontology-based cognitive assignment engine_in accordance with embodiments of the present invention. FIG. 4 contains steps 400-460, which may be performed by embodiments based on platforms described in FIGS. 1-3.

In some embodiments, the method of FIG. 4 may at least in part comprise a training of phase a machine-learning mechanism. This mechanism trains a self-learning cognitive analysis engine (CAE) system to identify and characterize ontological structures by means of cognitive or other known methods. The training takes place by submitting to the CAE system a corpus of graphical content that comprises known ontological structures. This corpus, by means of known machine-learning techniques, is used to give the CAE system experience in extracting and characterizing such structures, identifying common features of the extracted structures, and organizing the common features into a hierarchy of templates.

In other cases, the method of FIG. 4 is performed by a CAE system that already knows how to extract, characterize, and organize ontological structures. Here, the system, using previously programmed or learned expertise, produces one or more new templates based on graphical content received in step 400. It is possible for a single embodiment of the present invention to perform both variations of the method of FIG. 4, initially learning how to generate templates during a training session, and then, once sufficiently trained, generating templates autonomously. It is also possible for an embodiment to undergo training while generating production templates, when it is deemed beneficial for an embodiment to continue to train the system, perhaps even indefinitely, in order continue to learn how to more accurately generate templates.

In step 400, the CAE receives a corpus of training content. This content may comprise any sort of visual content that an implementer believes would comprise ontological structures similar to the structures that would be comprised by received production content. As explained above, although this document and accompanying figures may refer to incoming "training images" for pedagogical purposes, the content may comprise any sort of training content or production content that comprises, consists of, is attached to, or identifies a photograph, graphical image, screen capture, video clip, animation, or other known type of visual or graphical object. Examples of such content include messages and notifications like an email message, a text message, a notification generated by a Web site, a log entry, a notification generated by an application, or a message generated by an operating system or other component of a host environment.

In step 410, the system identifies combinations of ontological structures in each instance of training content. These identifications may be made by any method, technique, or technology known in the art, such as by means of natural-language processing of embedded text or of a graphical representation of textual content; by known means of inferring semantic meaning from graphical content by partitioning the content into regions or by recognizing certain patterns of contrast, brightness, or other parameters; or by means of inferences derived by cognitive, semantic, or textual analytics, or by other artificially intelligent technologies.

For example, known technologies of cognitive image segmentation, region decomposition, and object detection can be adapted to isolate, identify, and characterize ontological structures comprised by a photograph, a screen capture of an application's user interface or Web-site page, an animation cel, or a frame of a video. Similarly, known cognitive and non-cognitive character-recognition technologies like optical-character recognition (OCR) can be applied to such graphical content to isolate, identify, and characterize ontological structures that represent textual content. In either case, known cognitive techniques and technologies can then be used to infer semantic meaning from the identified ontological structures, from the positions of the identified ontological structures, and from the characteristics of the identified ontological structures.

FIGS. 6-9 give examples of ontological structures and characteristics that may be identified in the graphical content. Ontological structures can, for example, comprise one or more of: a graphical or textual company logo; a characteristic layout of windows; a title bar; a distinctive pop-up dialog box, context menu, or drop-down menu; distinctive text, such as "Error, "Warning," "Do you wish to save . . . ," a particular filename or filename extension, or distinctive wording of an error message or system warning; a name of an application, company, or host system; an application-specific menu or task view; a textual URL; a distinctive font, highlighting, or underlining of a particular string of text; a graphical symbol or object; highlighting; a certain title or label of a window; or a distinctive type of window that contains a distinctive combination of elements similar to those listed above.

In step 420, the system may further identify an absolute position or location of a subset of the identified ontological structures in an image, video frame, animation cel or other element of the graphical content, or relative positions of multiple structures, in the image, video frame, animation cel, or other element. As with the identifications of step 410, these further identifications may be made with any known method of pattern recognition, cognitive analysis, natural-language processing, or artificial intelligence.

For example, the system may identify that a structure identified in step 410 as either a graphical menu or a taskbar is located in an area of a screen-capture image that is associated with taskbars of a particular operating system. In another example, the system could identify that a candidate folder-hierarchy window is located immediately to the left of a window that lists files contained in a selected folder, which suggests that the two windows are arranged in a layout common to a certain type of file-management utility.

In step 430, the system correlates the identifications of steps 410 and 420 in order to cluster entities that share common characteristics. These correlations can be inferred by artificially intelligent or self-learning applications that comprise techniques and technologies like machine learning, cognitive analytics, semantic analytics, and text analytics, as well as by non-cognitive techniques and technologies, such as an application that comprises a pattern-matching algorithm.

For example, the system may correlate detections of a graphical logo of a company or application, even if the instances of the logo in different images are different sizes, colors, or have slight variations. Similarly, the system may correlate instances of a particular application's context-sensitive task window, even if each instance of the window contains different text, by determining that each instance is located in a similar region of a screen capture that also contains text identifying the particular application.

In step 440, the system generates one or more templates that are each associated with one classification of document. For example, one template might represent screen-captured images of a computer screen generated by a "DBMSWare" application when the application detects a particular class of error conditions. A second template might represent database-software invoices generated by the DBMSWare company. A third template could be a more general version of the second template associated with database-software invoices generated by any software vendor. Fourth and fifth templates could respectively represent invoices generated for any type of software purchase by any software vendor, and invoices generated by any type of product or service request. In yet other examples, a template could represent an image of a particular family of logged error messages that includes a Web-site URL address, an IP address, and a diagnostic code; a screen-capture of a frozen application; an image of a Web page that is incorrectly formatted or that lacks certain features; a snapshot of an operating system's or of an application's version number or configuration settings; or an image of corrupted word-processing or image-processing content.

As suggested above, the system may organize these templates into a hierarchy or other data structure. For instance, in the previous examples, the second, third, fourth, and fifth templates could be organized into a tree structure, where each parent node's template is a more general version of templates that occupy nodes that are child nodes of the parent node. The third template, for example, would be associated with a parent node of a child node that is associated with the second template.

Figure 9:
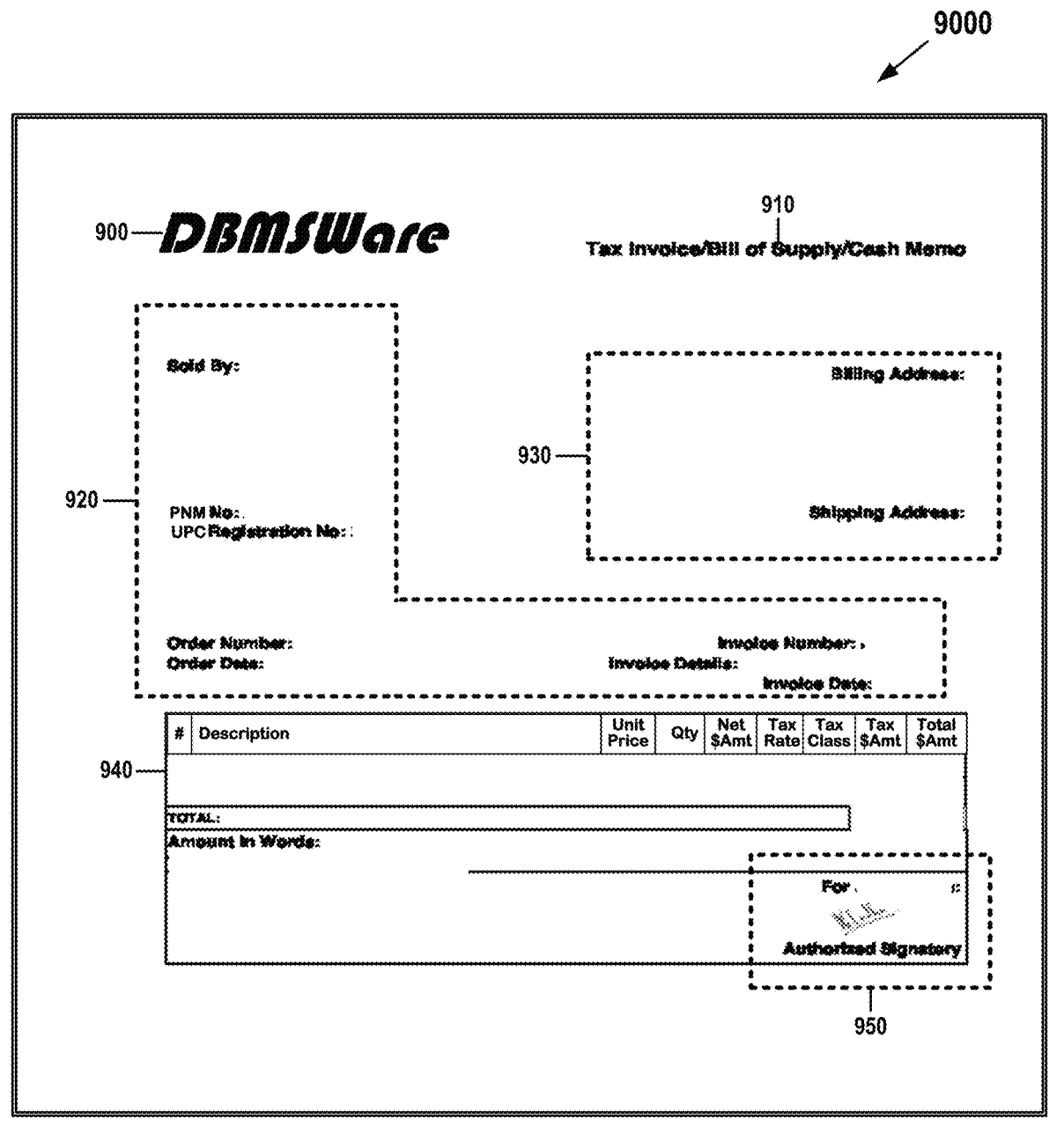

FIGS. 7-9 show an example of a template and of several training images and ontological structures from which the template is derive.

In step 450, the system generates a hash code or other numeric or alphanumeric identifier of each template. These identifiers may be generated by any means known in the art. In embodiments that generate true hash codes, each code is associated with only one template, each code contains the same number of digits, and the encoding computation is selected so as to minimize the possibility of associating the same code value with more than one template. These constraints may not be comprised by other embodiments.

In some embodiments a value of a particular template's hash code or other identifier is associated with the combination of ontological structures and characteristics comprised by that template. For example, all templates that are associated in some way with a "DBMSWare" application might be associated with seven-digit identifiers that share the same subsequence of two digits. Similarly, all templates that are associated with file-handling errors of a particular operating system's file-management utility might be associated with 14-character alphanumeric identifier that begins with the character string "FH7."

In step 460, the system organizes and stores the identifiers generated in step 450. For example, the system might sort the identifiers numerically and store the sorted identifiers in a distributed hash table. Embodiments of the present invention are flexible enough to accommodate any known method of organizing or storing such identifiers that is desired by an implementer.

Subsequent performances of the method of FIG. 4 may identify additional templates that will be added to the previously stored identifiers. Some embodiments may also, in a subsequent performance of the method of FIG. 4, revise the contents of a previously stored templates or revise an identifier previously associated with a previously stored template, based on new inferences or training based on a most recent receipt of additional graphical content or of feedback returned by a user or implementer that identifies the accuracy of previously generated templates. Certain embodiments of the present invention may comprise self-learning CAE systems that continue to learn over time how to more accurately generate and assign identifiers to templates.

Figure 5:
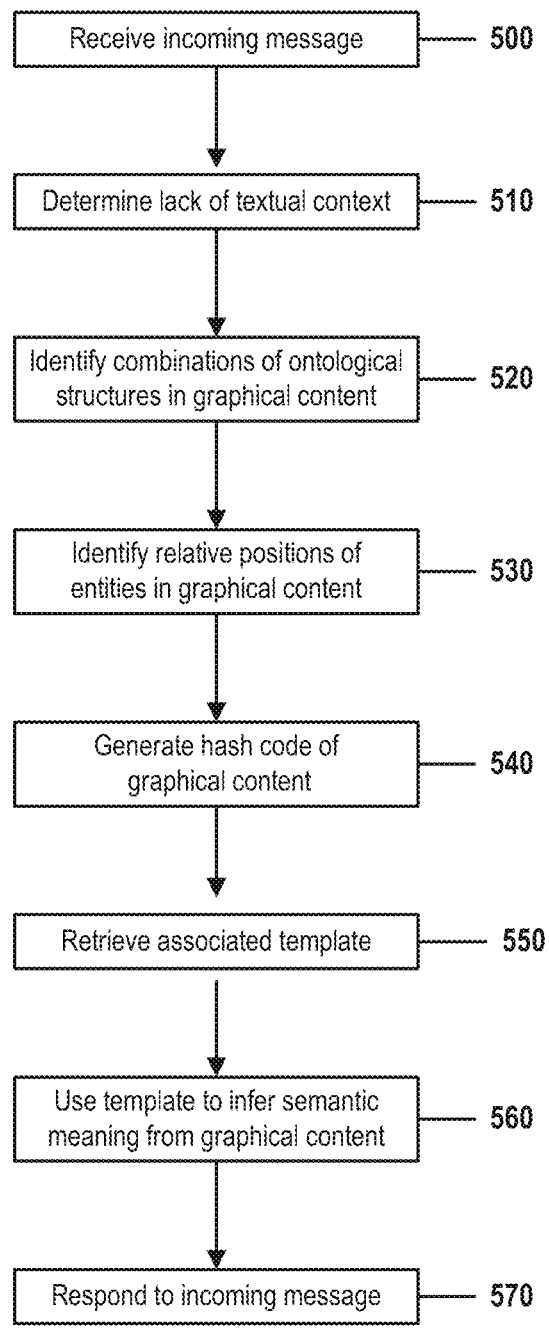
FIG. 5 is a flow chart that illustrates the steps of a method for a self-learning ontology-based cognitive assignment engine_in accordance that incorporates the ontological templates produced by the method of FIG. 4.

FIG. 5 is a flow chart that illustrates the steps of a method for a self-learning ontology-based cognitive assignment engine_in accordance that incorporates the ontological templates produced by the method of FIG. 4. FIG. 5 contains steps 500-570, which may be performed by embodiments based on platforms described in FIGS. 1-3.

In step 500, an improved CAE system, similar to the system of FIG. 4, receives an incoming message in a production environment. As described above, this incoming message may be any sort of communication that comprises a visual element, such as a report of an error condition to which is attached a screen-capture image that shows the error.

In step 510, the system identifies that the incoming message does not contain sufficient information to allow the CAE system to, by known means of textual analysis, diagnose or triage the message or to identify a party to which the message should be forwarded.

For example, the message may be an email message that consists of a subject line reading "screenshot of error condition," an attached screen-capture formatted as a JPEG image, and no body text. Although this message comprises a graphical image that identifies the problem being reported, it contains no text that can be used to classify the problem or determine which support group should receive the error report.

In steps 520-530, the system identifies, from the attachment, ontological structures, locations of some or all of the identified ontological structures, or other characteristics of some or all of the identified ontological structures. This procedure is performed by means of steps similar to those of steps 410-430 of FIG. 4.

In step 540, the system generates, as a function of the identifications of steps 520 and 530, a hash code or other identifier. The generated identifier is generated by means of steps similar to those of 450 of FIG. 4, such that a received message that contains ontological structures similar to those of a previously stored template will be assigned an identifier that is similar to the identifier of the previously stored template.

In step 550, the system uses the identifier generated in step 540 to look up and retrieve a previously stored template that is associated with a similar identifier. If no previously stored identifier exactly matches the identifier generated in step 540, the system may either retrieve a previously stored identifier that provides the closest match or may use steps similar to those of the method of FIG. 4 to generate a new template and identifier and then add the new identifier to the existing identifiers previously stored in step 460 of FIG. 4.

In step 560, the system infers semantic meaning to the message received in step 500. This inference may be derived by known techniques of cognitive analytics or artificially intelligence as a function of known characteristics of the stored template or of semantic meaning previously associated with the stored template retrieved in step 550. The inference may also be derived as a function of metadata or other information associated with the template. In this manner, the system associates the incoming message with a meaning or intent that allows the system to classify the message, determine an appropriate manner in which to respond to the message, or select an appropriate responder team to which the message should be forwarded.

In step 570, the system responds to the incoming message as a function of the inferences derived during step 560. For example, after identifying an appropriate responder team, the system may forward the message to that team and log the fact that the message was forwarded. The system might also perform other responsive actions, such as sending a reply to a sender of the message advising the sender of steps that should be taken to resolve an outstanding issue raised by the message. The system might also store the incoming message, the system's response to the message, and a sender's response to the system's response for incorporation into a corpus of training data that will be used to further train the system, or a template-generating component of the system, in future machine-learning sessions. In some embodiments, the system would also generate statistics or log entries that can be incorporated into future training sessions or forwarded to other applications.

In one example, the system in step 520 identifies ontological structures, comprised by the production message received in step 500, and in step 540 generates a hash code identifier as a function of these identified structures. The system then retrieves a previously stored identifier in step 550 that exactly or approximately matches the newly generated identifier. The previously stored identifier points to a previously stored template that contains ontological structures similar in some way to the structures of the newly received message. The stored template was previously associated, during a performance of the method of FIG. 4, with incoming messages that report an unexpected termination of a transaction-processing application. This classification is further associated with the newly received production message, allowing the system to classify the new message as requiring assistance from the transaction-processing support group or to a computerized application that provides support for the transaction-processing application. The system then forwards the message to the selected group or support application.

Figure 6:
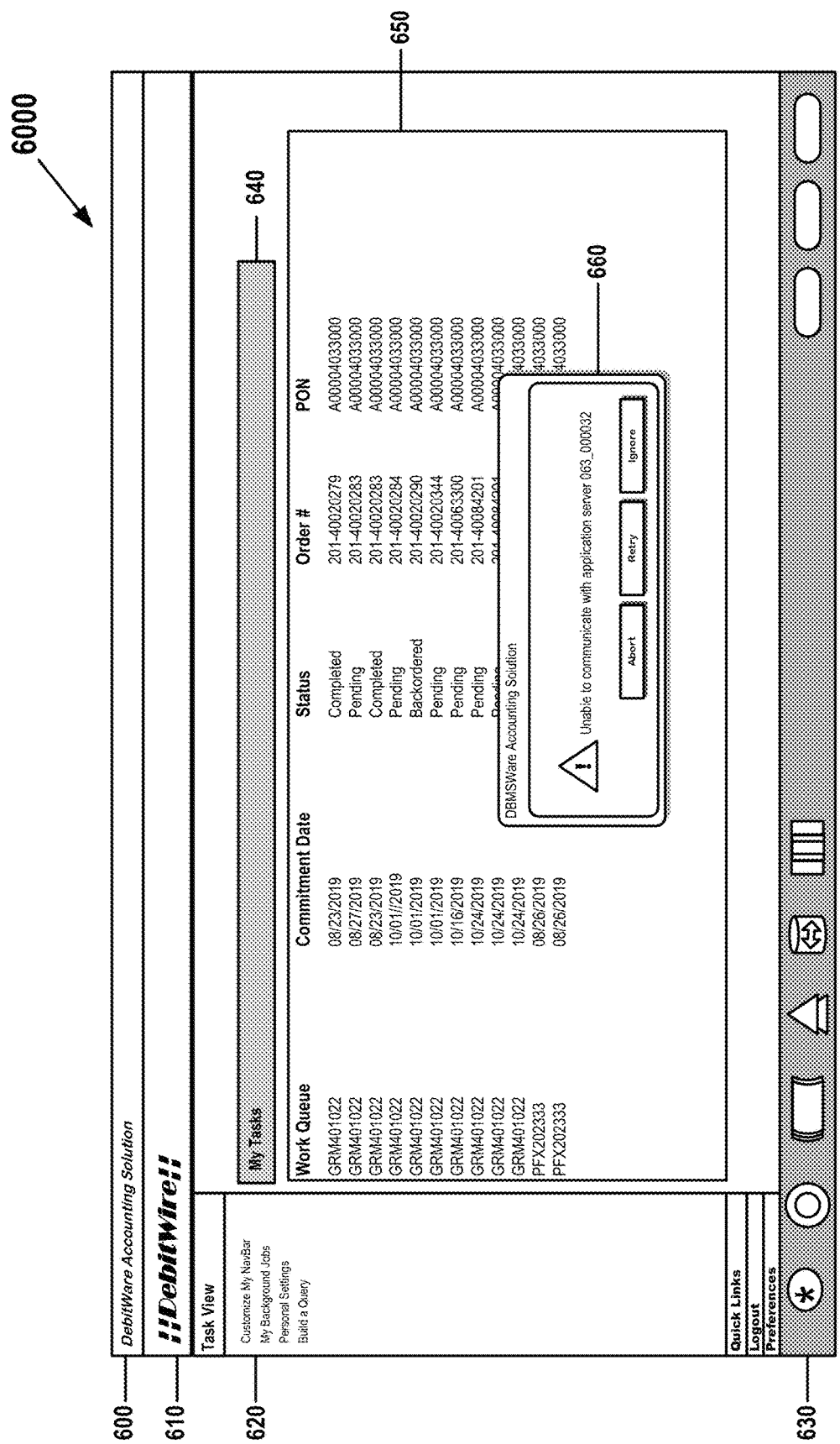
FIG. 6 shows ontological structures inferred from a first graphical object by embodiments of the present invention.

FIG. 6 shows ontological structures 600-660 inferred from a first graphical object 6000 by embodiments of the present invention. FIG. 6 shows items 6000 and 600-660.

Here, the first graphical object or graphical content 6000 is a screen-capture image of a "DebitWire" accounting application during the occurrence of an error condition. In this example, a user has captured the DebitWire error screen 6000 and attached the captured image to an email message sent to a customer-service operation. The email message, although intended to report the error condition, contains no text capable of identifying the error. The sender instead expected a human recipient to understand the nature of the reported error by viewing the screen-capture attachment.

As described above, if this message is received by a known automated CAE application, the known application will be unable to determine the sender's intent because known CAE systems infer a message's meaning by analyzing the message's textual content. In this case, the message has no textual content, rendering such an inference impossible.

As described in FIGS. 4 and 5, a self-learning CAE application that is implemented in accordance with embodiments of the present invention may infer the sender's intent by identifying and characterizing ontological structures contained in the message's screen attachment. Such cognitive CAE applications may further infer the sender's intent by identifying an identified ontological structure's position on the screen capture image or by identifying the relative positions of two or more ontological structures, relative to each other. Additional inferences may be derived by identifying characteristics of graphical elements comprised by an identified ontological structure.

For example, an embodiment may identify the following ontological structures in screen-capture 6000:
- an application title bar 600 that identifies the DebitWire application;
- a DebitWire graphical logo 610 that further identifies the application;
- a left-hand frame 620 that provides a task view of current tasks being managed by the DebitWire application;
- a taskbar 630 that is characteristic of a particular operating system or Web browser;
- a function title bar 640 identifying that the DebitWire application was performing an operation related to the application's "My Tasks" view when the error occurred;
- a right-hand frame 650 that is consistent with a DebitWire task view; and
- an error-condition pop-up 660 that identifies an error condition of the DebitWire application.

Embodiments of the present invention may isolate and identify these seven structures through any means known in the art, such as by means of cognitive analytics, pattern-matching, optical-character recognition, or other methods of image segmentation or region decomposition. The system may, for example, determine that object 600 is likely to identify a computer application, based on the fact that application title bars are generally located in the absolute position occupied by object 600. From this information, the system may then use character-recognition or pattern-matching technology to determine that the image has captured a screen of the DebitWire application. In this way, both the absolute position and a characteristic of the intrinsic content of object 600 allow the system to classify object 600 as an ontological structure representing an application title bar.

Similar steps can be used to identify and characterize objects 610-660. For example, the system may cognitively recognize that the position of object 630, relative to the positions of objects 600 and 610, suggests that graphical object or content 6000 is a screen capture of the user interface of a particular operating system or Web browser. Recognition that certain bit patterns comprised by object 660 can be interpreted as text allows the system, by means of semantic analytics or text analytics, to determine that graphical content 6000 reports a certain class of error condition. Combining all these inferences may allow the system to determine that graphical content 6000 is a screen capture of a particular error condition occurring during the a "My Tasks" view of a DebitWire application running under a particular operating system or hosted by a particular Web browser.

In other cases, the system may not be able to make such cognitive inferences about the semantic meaning of graphical content 6000. But even in such cases, the system will be able to correlate each object's graphical structure, including graphical features like borders, fonts, and variations in contrast or brightness, absolute position, or relative positions, in order to identify, segment, and extract each structure. These structures may then be associated with structure-specific values as functions of their physical locations and graphical patterns. As described in FIGS. 4-5, a hash code or other identifier may be associated with the entire image by performing a hash function on those values.

FIG. 7 shows ontological structures inferred from a second graphical object by embodiments of the present invention. FIG. 7 shows items 7000 and 700-750.

Here, the second graphical object or graphical content 7000 is a screen-capture image of an online invoice produced by a "DBMSWare" company. As in FIG. 6, an embodiment of the present invention makes cognitive inferences about ontological structures comprised by content 7000, based on rules learned during previous machine-learning training sessions like those described by FIG. 4. Again, these structures are isolated, extracted, and characterized as a function of each structure's absolute and relative position in content 7000, as well as by recognition of each structure's internal features, which may include borders, fonts, OCR-recognized text, colors, text layouts, and other distinctive, recognizable patterns.

In this case, the system identifies the following structures in content 7000:
- a graphical logo 700 identifying the company DBMSWare;
- a title 710 identifying the object 7000 as a graphical representation of a customer's copy of an invoice or bill of sale;
- a first block of order/vendor information 720 that identifies the seller of the invoiced items and various order-specific information;
- a second block of customer-related information 730 that identifies buyer-specific information, such as the buyer's billing and shipping addresses;
- a third block of product-related information 740 that itemizes the invoiced products; and
- a signature block 750 that may be electronically signed by the seller.

FIG. 8 shows ontological structures inferred, by embodiments of the present invention, from a third graphical object 8000 that is related to the second graphical object 7000 of FIG. 7. FIG. 8 shows items 8000 and 800-850.

The third graphical object or graphical content 8000 is another DBMSWare invoice that is formally similar to the second-object invoice 7000 of FIG. 7. However, despite containing ontological structures 800-850 that are analogous to the structures 700-750 of object 7000, object 8000 comprises a layout and textual details that are distinct from those of object 7000.

Embodiments of the present invention, however, may use cognitive means based on the same criteria enumerated in FIG. 7 to identify ontological structures 800-850. Although objects 800-850 may differ from the respectively corresponding objects 700-750 in absolute position, text characteristics, or graphical symbols, a properly trained embodiment of the present invention will be able to isolate and identify objects 800-850 as being analogous to objects 700-750.

For example, the system would identify in object 8000:
- a graphical logo 800 identifying the company DBMSWare;
- a title 810 identifying the object 8000 as a graphical representation of a customer's copy of an invoice or bill of sale;
- a first block of order/vendor information 820 that identifies the seller of the invoiced items and various order-specific information;
- a second block of customer-related information 830 that identifies buyer-specific information, such as the buyer's billing and shipping addresses;
- a third block of product-related information 840 that itemizes the invoiced products; and
- a signature block 850 that may be electronically signed by the seller.

Here, although the graphical object 700 is not identical to graphical object 800, the system recognizes both as being DBMSWare logos. This recognition is made possible by training sessions like those described in FIG. 4 that have taught the self-learning system how to recognize a certain graphic pattern as being a DBMSWare logo. The system thus recognizes objects 700 and 800 as being logos despite the fact that the two have different borders, may differ slightly in size, and are located at different positions on the page.

Similarly, the system's cognitive abilities allow the system to infer that items 710 and 810 both identify their respective pages as a recipient's copy of a bill of sale. In this case, rules learned by the cognitive CAE system specify that such a title is generally found either directly below a top-aligned, horizontally centered DBMSWare logo or to the right of a top-aligned, left-aligned DBMSWare logo.

Similar cognitive inferences about the positions, boundaries, and internal features of each candidate ontological structure of graphical content 7000 or 8000 allow the system to similarly correlate other ontological structures of content 7000 with those of content 8000. In particular, the system may infer that:

- objects 700 and 800 both represent DBMSWare logo located at an expected absolute position on the page or at an expected position relative to other ontological structures on the page;
- objects 710 and 810 both represent an identification of a bill of sale, located at an expected absolute position on the page or at an expected position relative to other ontological structures on the page;
- objects 720 and 820 both represent a block of order/vendor information, located at an expected absolute position on the page or at an expected position relative to other ontological structures on the page;
- objects 730 and 830 both represent a block of customer information, located at an expected absolute position on the page or at an expected position relative to other ontological structures on the page;
- objects 740 and 840 both represent an enumeration of invoiced items, located at an expected absolute position on the page and in an expected position relative to other ontological structures on the page; and
- objects 750 and 850 both an electronic signature block located at an expected absolute position on the page or at an expected position relative to other ontological structures on the page.

Embodiments of the present invention may assign similar numeric values to analogous objects that are interpreted as being graphically or semantically similar. For example, the system may assign similar or identical numeric values to objects 700 and 800 because objects 700 and 800 both comprise similar bit patterns or because objects 700 and 800 may both be interpreted as DBMSWare logos. Similarly, the system may assign similar or identical numeric values to objects 750 and 850 because objects 750 and 850 both comprise bit patterns that may be interpreted as similar textual objects, because objects 750 and 850 are both located in a lower-right corner of an invoice document, or because objects 750 and 850 may both be interpreted as signature blocks.

As described in FIGS. 4 and 5, embodiments compute a hash function on the values associated with each graphical content's ontological structures in order to generate a hash identifier for each graphical object. Therefore, if two screen captures contain similar ontological structures that are associated with similar numeric values, the system will associate the two screen captures with similar hash values. In this way, a hash value of a received graphical image can be correlated with particular types of graphical, ontological structures comprised by that image, or can be correlated with an inferred semantic meaning of that image.

FIG. 9 shows an ontological template generated by an embodiment of the present invention by inferring relationships between ontological structures of the first graphical object of FIG. 7 and ontological structures of the second graphical object of FIG. 8. FIG. 9 shows items 9000 and 900-950.

Here, the system correlates corresponding pairs of ontological structures identified in FIGS. 7 and 8 in order to identify commonalities that may be used to construct a generalized template.

In the example of FIGS. 7-9, the second graphical object 7000 and the third graphical object 8000 both contain a set of five ontological structures. Each of object 7000's five structures corresponds to an analogous structure of object 8000.

The system generates template 9000 by isolating the common features of each analogous pair and then storing those common features in the template. For example, although DBMSWare logo 700 and DBMSWare logo 800 contain somewhat different graphical features, template 9000 comprises a logo structure 900 that consists of the DBMSWare text and font that are common to both 700 and 800.

Similarly:
- the template's invoice title 910 consists of text that is common to both FIG. 7's title 710 and FIG. 8's title 810;
- the template's vendor/invoice information 920 consists of text objects common to both FIG. 7's vendor/invoice information 720 and FIG. 8's vendor/invoice information 820;
- the template's customer information 930 consists of text objects common to both FIG. 7's customer information 730 and FIG. 8's customer information 830;
- the template's invoiced-item listing 940 consists of a tabular layout and column headings that are common to both FIG. 7's invoiced-item listing 740 and FIG. 8's invoiced-item listing 840; and
- the template's signature block 950 consists of text and graphics that are common to both FIG. 7's signature block 750 and FIG. 8's signature block 850.

Some embodiments may also format the layout of template 9000 such that template structures are located at absolute or relative positions common to a majority of training objects. In the current examples, which consist of only two training-content objects 7000 and 8000, the system can only guess the location at which to position an object that is located at different positions in the training content. For example, because DBMSWare logos 700 and 800 each occur only once in a particular location, the template does not attempt to specify an absolute location of DBMSWare logos in an incoming message. In both cases, however, the logos are located at the top of the page, above text blocks 720-750. The system thus places template logo 900 at the top of template 9000 and, when analyzing an incoming message, is more likely to interpret an object as a DBMSWare logo if that object is located at a relative position above the positions of structures similar to template structures 920-950.

Because template 9000 contains structures 900-950 that are similar to structures 700-750 of second graphical object 7000 and that are similar to structures 800-850 of third graphical object 8000, template 9000 will be associated with a hash value (or similar identifier) that is identical or close to the hash values or identifiers of the second or third graphical objects 7000 and 8000. This characteristic allows the system to quickly locate template 9000 by using a hash value computed for second or third graphical objects 7000 and 8000 to look up template 9000.

Template 9000 is stored with metadata or other information that identifies a semantic meaning of template 9000 or of ontological structures 900-950 comprised by template 9000. For example, template 9000 may be associated with an identification of a DBMSWare invoice. Similarly, a template associated with first graphical object 6000 of FIG. 6 could be associated with an identification of a particular error condition occurring while viewing a "My Tasks" screen of application DebitWire. Because of the similarities in the hash functions used to compute each image's hash value and each template's has value, identifying a template that has a hash value similar to a hash value of an incoming message's graphic content allows the system to infer that the incoming message's sender intends the message to have a meaning similar to the semantic meaning associated with the located template.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A cognitive assignment engine (CAE) system comprising a processor, a memory coupled to the processor, and a computer-readable hardware storage device coupled to the processor, the storage device containing program code configured to be nm by the processor via the memory to implement a method for a self-learning ontology-based cognitive assignment engine, the method comprising:
   the system intercepting an incoming message that comprises graphical content;
   the system identifying characteristics of one or more ontological structures inferred from the graphical content,
      where the graphical content is a graphical screen-capture image,
      where each structure of the ontological structures is a graphical object and a subset of pixels of the screen-capture image,
      where each characteristic of the identified characteristics comprises a category of screen-capture objects, and
      where the categories are selected from the group consisting of: logos, title bars, task-view panes, taskbars, and error-condition pop-up windows;
   the system clustering the structures into groups,
      where each group consists of structures that share a same category,
      where the system has inferred through artificial intelligence that each structure in a same group depicts an instance of a same semantic object, regardless of the each structure's size, color, or embedded text, and
      where a pair of structures are inferred to depict instances of the same semantic object as a function of each structure's relative position within the screen-capture image and of a category of a group that contains the pair of structures;
   the system organizing the groups into a hierarchical ontology that represents an ontology of the inferred semantic objects;
   the system associating one or more numeric values with each group;
   the system computing a hash code of the incoming message by performing a hash function upon a subset of the numeric values;
   the system retrieving, as a function of the hash code, a matching template of a set of previously stored templates;
   the system organizing the matching templates into a hierarchical structure as a function of the hierarchical ontology and
   the system, as a function of a semantic meaning associated with the matching template, assigning the incoming message to an appropriate responder of a plurality of responders.

2. The system of claim 1, where the hash codes are retrieved from a distributed hash table.

3. The system of claim 2, where the retrieving further comprises:
   the system retrieving from the distributed hash table a matching value that most closely matches a value of the hash code; and
   the system determining that the matching value is an index value capable of enabling the system to retrieve the matching template.

4. The system of claim 1,
   where the incoming message reports an occurrence of an error condition that affects a computerized system,
   where the semantic meaning comprises information from which the reporting of the error condition can be inferred, and
   where the responder is a technical-support resource configured to respond to the error condition.

5. The system of claim 1,
   where the identified characteristics comprise an absolute location, within the graphical content, of a first structure of the one or more ontological structures.

6. The system of claim 1,
   where the identified characteristics comprise a set of relative locations, within the graphical content, of a plurality of structures of the one or more ontological structures.

7. The system of claim 1,
   where the identified characteristics characterize a graphical element comprised by a first structure of the one or more ontological structures.

8. A method for a self-learning ontology-based cognitive assignment engine, the method comprising:
   intercepting an incoming message that comprises graphical content;
   identifying characteristics of one or more ontological structures inferred from the graphical content,
      where the graphical content is a graphical screen-capture image,
      where each structure of the ontological structures is a graphical object and a subset of pixels of the screen-capture image,
      where each characteristic of the identified characteristics comprises a category of screen-capture objects, and where the categories are selected from the group consisting of: logos, title bars, task-view panes, taskbars, and error-condition pop-up windows;
the system clustering the structures into groups,
where each group consists of structures that share a same category,
where the system has inferred through artificial intelligence that each structure in a same group depicts an instance of a same semantic object, regardless of the each structure's size, color, or embedded text, and
where a pair of structures are inferred to depict instances of the same semantic object as a function of each structure's relative position within the screen-capture image and of a category of a group that contains the pair of structures;
the system organizing the groups into a hierarchical ontology that represents an ontology of the inferred semantic objects;
the system associating one or more numeric values with each group;
the system computing a hash code of the incoming message by performing a hash function upon a subset of the numeric values;
the system retrieving, as a function of the hash code, a matching template of a set of previously stored templates;
the system organizing the matching templates into a hierarchical structure as a function of the hierarchical ontology; and
assigning, as a function of a semantic meaning associated with the matching template, the incoming message to an appropriate responder of a plurality of responders.

9. The method of claim 8, the retrieving further comprises:
retrieving from a distributed hash table a matching value; that most closely matches a value of the hash code; and
determining that the matching value is an index value capable of enabling the system to retrieve the matching template.

10. The method of claim 8,
where the incoming message reports an occurrence of an error condition that affects a computerized system,
where the semantic meaning comprises information from which the reporting of the error condition can be inferred, and
where the responder is a technical-support resource configured to respond to the error condition.

11. The method of claim 8,
where the identified characteristics comprise an absolute location, within the graphical content, of a first structure of the one or more ontological structures.

12. The method of claim 8,
where the identified characteristics comprise a set of relative locations, within the graphical content, of a plurality of structures of the one or more ontological structures.

13. The method of claim 8,
where the identified characteristics characterize a graphical element comprised by a first structure of the one or more ontological structures.

14. The method of claim 8, further comprising providing at least one support service for at least one of creating, integrating, hosting, maintaining, and deploying computer-readable program code in the con system, wherein the computer-readable program code in combination with the computer system is configured to implement the intercepting, the identifying, the organizing, the associating, the computing, the retrieving, and the assigning.

15. A computer program product, comprising a computer-readable hardware storage device having a computer-readable program code stored therein, the program code configured to be executed by a cognitive assignment engine (CAE) system comprising a processor, a memory coupled to the processor, and a computer-readable hardware storage device coupled to the processor, the storage device containing program code configured to be run by the processor via the memory to implement a method for a self-learning ontology-based cognitive assignment engine, the method comprising:
the system intercepting an incoming message that comprises graphical content;
the system identifying characteristics of one or more ontological structures inferred from the graphical content,
where the graphical content is a graphical screen-capture image,
where each structure of the ontological structures is a graphical object and a subset of pixels of the screen-capture image,
where each characteristic of the identified characteristics comprises a category of screen-capture objects, and
where the categories are selected from the group consisting of: logos, title bars, task-view panes, taskbars, and error-condition pop-up windows;
the system clustering the structures into groups,
where each group consists of structures that share a same category,
where the system has inferred through artificial intelligence that each structure in a same group depicts an instance of a same semantic object, regardless of the each structure's size, color, or embedded text; and
where a pair of structures are inferred to depict instances of the same semantic object as a function of each structure's relative position within the screen-capture image and of a category of a group that contains the pair of structures;
organizing the groups into a hierarchical ontology that represents an ontology of the inferred semantic objects;
the system associating one or more numeric values with each group;
the system computing a hash code of the incoming message by performing a hash function upon a subset of the numeric values;
the system retrieving, as a function of the hash code, a matching template of a set of previously stored templates;
the system organizing the matching templates into a hierarchical structure as a function of the hierarchical ontology; and
the system, as a function of a semantic meaning associated with the matching template, assigning the incoming message to an appropriate responder of a plurality of responders.

16. The computer program product of claim 15, where the hash codes are retrieved from a distributed hash table.

17. The computer program product of claim 16, where the retrieving further comprises:
the system retrieving from the distributed hash table a matching value that most closely matches a value of the hash code; and
the system determining that the matching value is an index value capable of enabling the system to retrieve the matching template.

18. The computer program product of claim 15,
where the incoming message reports an occurrence of an error condition that affects a computerized system,
where the semantic meaning comprises information from which the reporting of the error condition can be inferred, and
where the responder is a technical-support resource configured to respond to the error condition.

19. The computer program product of claim 15,
where the identified characteristics comprise an absolute location, within the graphical content, of a first structure of the one or more ontological structures.

20. The computer program product of claim 15,
where, the identified characteristics comprise a set of relative locations, within the graphical content, of a plurality of structures of the one or more ontological structures.

* * * * *